(12) United States Patent
Asokan et al.

(10) Patent No.: US 8,145,907 B2
(45) Date of Patent: Mar. 27, 2012

(54) SECURE DATA TRANSFER

(75) Inventors: Nadarajah Asokan, Espoo (FI); Timo Heikkinen, Tampere (FI)

(73) Assignee: Nokia Corporation, Espoo (FI)

( * ) Notice: Subject to any disclaimer, the term of this patent is extended or adjusted under 35 U.S.C. 154(b) by 1463 days.

(21) Appl. No.: 11/525,152

(22) Filed: Sep. 22, 2006

(65) Prior Publication Data

US 2007/0016781 A1    Jan. 18, 2007

Related U.S. Application Data

(63) Continuation of application No. PCT/FI2004/000162, filed on Mar. 22, 2004.

(51) Int. Cl.
*H04L 29/06* (2006.01)
(52) U.S. Cl. .................. 713/170; 380/249; 713/168
(58) Field of Classification Search .............. 380/249; 713/170
See application file for complete search history.

(56) References Cited

U.S. PATENT DOCUMENTS

| 6,643,774 B1 * | 11/2003 | McGarvey ............ 713/155 |
| 6,718,467 B1 * | 4/2004 | Trostle ............ 713/171 |
| 7,215,775 B2 * | 5/2007 | Noguchi et al. ............ 380/249 |
| 2002/0164026 A1 * | 11/2002 | Huima ............ 380/247 |

FOREIGN PATENT DOCUMENTS

| DE | 10218943 | 11/2003 |
| WO | WO 03/007542 | 1/2003 |

* cited by examiner

*Primary Examiner* — Kim Vu
*Assistant Examiner* — Randal Moran
(74) *Attorney, Agent, or Firm* — Harrington & Smith

(57) ABSTRACT

The invention concerns secure data transfer from a first radio communication device of a first party to a second radio communication device. A random first symmetric key is generated at the first terminal device. User data of the first terminal device is encrypted with the first symmetric key. The first symmetric key is encrypted with a public key of a third party. The encrypted first symmetric key is sent from the first terminal device to the second terminal device via a transfer device. The encrypted first symmetric key is decrypted at the second terminal device by utilizing a secret key associated with the public key and comprised in a security device of the third party. The encrypted user data is sent from the first terminal device to the second terminal device via the transfer device. The encrypted user data is decrypted at the second terminal device with the first symmetric key.

7 Claims, 2 Drawing Sheets

SECURE DATA TRANSFER

This is a Continuation of International Application No. PCT/FI2004/000162 filed Mar. 22, 2004, which designated the U.S. and was published under PCT Article 21(2) in English.

FIELD OF THE INVENTION

The present invention relates to secure data transfer. In particular, the present invention relates to providing secure data transfer in a novel and improved way from a first radio communication device of a first party to a second radio communication device in cases where the data transfer is to be overseen by a transfer device of a second party.

BACKGROUND OF THE INVENTION

Radio communication devices, such as mobile phones, have rapidly incorporated more and more various applications in the recent years. Applications such as address books, calendars and notebooks are common. Various messaging services, such as email and short message service may typically be used with a recent radio communication device. As a result a typical radio communication device contains more and more personal user data, such as saved messages, address book entries, calendar entries etc. Typically user data is stored on a SIM-card (Subscriber Identity Module), and/or in a storage device of the radio communication device, such as a memory chip.

Also typically user data is private and may contain highly sensitive information, such as credit card numbers etc. Thus user data needs to be protected against unauthorized access. If a radio communication device is damaged or fails, it may be brought to a servicing point to be swapped for a new device. In such a case user data is typically transferred or recovered from the damaged or failed device to the new device. This data recovery or transfer is typically overseen by servicing point personnel, in other words by someone other than the owner of the device. As a result, it needs to be ensured that the user data to be recovered cannot be accessed by the servicing point personnel either intentionally or inadvertently.

Typically software used by current servicing point devices scrambles the user data to be transferred so that it cannot be opened with standard personal computer software. However, this prior art protection is typically weak and easily broken.

Thus there is an obvious need for a more secure solution providing secure data transfer from a first radio communication device to a second radio communication device.

SUMMARY OF THE INVENTION

A first aspect of the present invention is a method of providing secure data transfer from a first radio communication device of a first party to a second radio communication device, which data transfer is to be overseen by a transfer device of a second party. In the method a first symmetric key is randomly generated at the first radio communication device. User data of the first radio communication device is then encrypted with the generated first symmetric key at the first radio communication device. The term 'symmetric key' refers to a key used in symmetric encryption systems in which the same key is used by both the sender to encrypt a message and by the receiver to decrypt the message.

According to the present invention the generated first symmetric key is encrypted at the first radio communication device with a public key of a third party. The encrypted first symmetric key is then sent from the first radio communication device to the second radio communication device via the transfer device. The term 'public key' refers to an encryption key used in asymmetric systems in which a sender uses a public key to encrypt a message, and the receiver uses a secret or private key associated with the public key to decrypt the message. As the terms imply, a public key is typically publicly available to anyone, whereas a secret key is only available to its owner.

Further according to the present invention the received encrypted first symmetric key is decrypted at the second radio communication device by utilizing a secret key associated with the public key and comprised in a security device of the third party which security device is connected to the second radio communication device. The encrypted user data is sent from the first radio communication device to the second radio communication device via the transfer device, and the received encrypted user data is decrypted at the second radio communication device with the decrypted first symmetric key.

In an embodiment of the first aspect of the present invention the received encrypted first symmetric key is decrypted at the second radio communication device by first generating randomly a second symmetric key at the second radio communication device. Then a request message is generated at the second radio communication device, which a request message comprises the generated second symmetric key and the received encrypted first symmetric key, and which request message is encrypted with the public key. The request message is then sent from the second radio communication device to the security device. The received request message is decrypted at the security device with the secret key to obtain the second symmetric key and the encrypted first symmetric key. Next the obtained encrypted first symmetric key is further decrypted at the security device with the secret key to obtain the first symmetric key. A response message is generated at the security device, which response message comprises the obtained first symmetric key, and which response message is encrypted with the obtained second symmetric key. The response message is sent from the security device to the second radio communication device. The received response message is decrypted at the second radio communication device with the generated second symmetric key to obtain the decrypted first symmetric key.

In an embodiment of the first aspect of the present invention a first authorization information is enclosed with the first symmetric key at the first radio communication device. A second authorization information is enclosed with the request message at the second radio communication device. At the security device it is verified that the received first authorization information matches the received second authorization information before generating the response message.

In an embodiment of the first aspect of the present invention a password input by the first party is used as first and second authorization information. In another embodiment of the invention an identity information associated with the first party is used as first and second authorization information.

A second aspect of the present invention is a system of providing secure data transfer between radio communication devices. The system comprises a first radio communication device of a first party having user data to be transferred. The first radio communication device comprises a first key generator for randomly generating a first symmetric key, and a user data encryption means for encrypting the user data with the generated first symmetric key. The system further comprises a second radio communication device for receiving the user data to be transferred. The system further comprises a transfer device of a second party for linking the first and second radio communication devices to each other, and for overseeing the data transfer.

According to the second aspect of the present invention the first radio communication device further comprises a key encryption means for encrypting the first symmetric key with a public key of a third party. The system further comprises a security device of the third party connected to the second radio communication device, and comprising a secret key associated with the public key. The second radio communication device comprises key decryption means for decrypting the encrypted first symmetric key by utilizing the secret key comprised in the security device, which encrypted first symmetric key has been received from the first radio communication device via the transfer device. The second radio communication device further comprises a user data decryption means for decrypting the encrypted user data with the decrypted first symmetric key, which encrypted user data has been received from the first radio communication device via the transfer device.

In an embodiment of the second aspect of the present invention the key decryption means comprises a second key generator for randomly generating a second symmetric key. The key decryption means further comprises a request message means for generating a request message comprising the generated second symmetric key and the received encrypted first symmetric key, for encrypting the request message with the public key, and for sending the request message to the security device. The security device comprises a response message means for decrypting the received request message with the secret key to obtain the second symmetric key and the encrypted first symmetric key, for further decrypting the obtained encrypted first symmetric key with the secret key to obtain the first symmetric key, for generating a response message comprising the obtained first symmetric key, for encrypting the response message with the obtained second symmetric key, and for sending the response message to the second radio communication device. The key decryption means further comprises a response message decryption means for decrypting the received response message with the generated second symmetric key to obtain the first symmetric key.

In an embodiment of the second aspect of the present invention the first radio communication device further comprises a first authorization means for enclosing a first authorization information with the first symmetric key. The second radio communication device further comprises a second authorization means for enclosing a second authorization information with the request message. The security device further comprises a verification means for verifying that the received first authorization information matches the received second authorization information before generating the response message.

In an embodiment of the second aspect of the present invention the second radio communication device is connected to the security device via a mobile telecommunication network.

A third aspect of the present invention is a radio communication device which comprises key decryption means for decrypting an encrypted first symmetric key by utilizing a secret key comprised in a security device connected to the radio communication device, which encrypted first symmetric key has been received from another radio communication device via a transfer device. The radio communication device further comprises a user data decryption means for decrypting encrypted user data with the decrypted first symmetric key, which encrypted user data has been received from the another radio communication device via the transfer device.

A fourth aspect of the present invention is a security device which comprises a response message means for receiving from a radio communication device a request message comprising a first symmetric key encrypted with a public key and a second symmetric key and the message encrypted with the public key, for decrypting the received request message with a secret key comprised in the security device and associated with the public key to obtain the second symmetric key and the encrypted first symmetric key, for further decrypting the obtained encrypted first symmetric key with the secret key to obtain the first symmetric key, for generating a response message comprising the obtained first symmetric key, for encrypting the response message with the obtained second symmetric key, and for sending the response message to the radio communication device.

The present invention allows a significantly more secure data transfer from a first radio communication device of a first party to a second radio communication device, when data transfer is to be over-seen by a second party. In particular, the present invention ensures that user data to be transferred from a first radio communication device to a second radio communication device cannot be accessed by servicing point personnel.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

Reference will now be made in detail to the embodiments of the present invention, examples of which are illustrated in the accompanying drawings.

Figure 1:
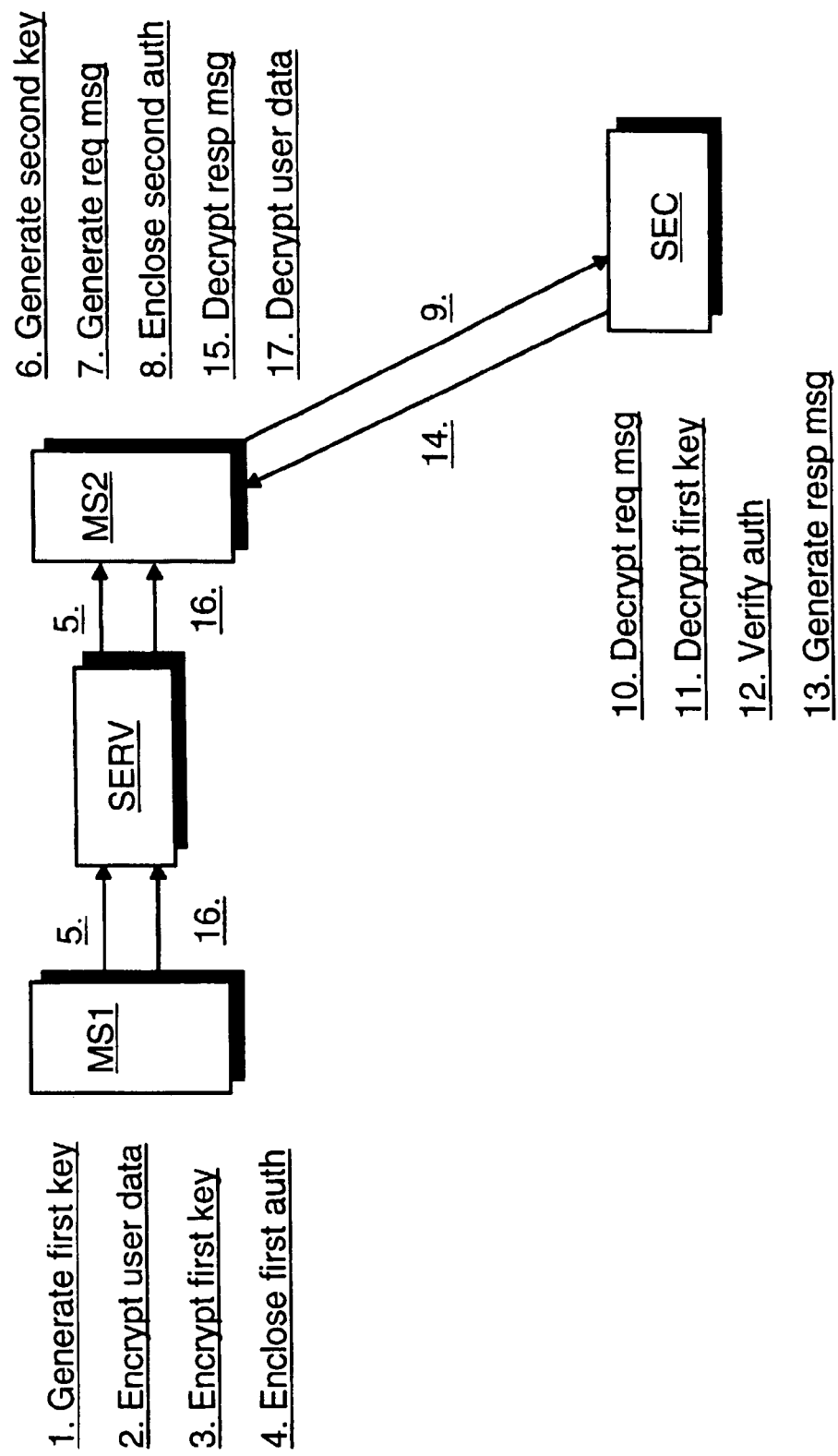
FIG. 1 is a graphical representation illustrating a method according to an embodiment of the present invention.

FIG. 1 illustrates an exemplary embodiment of the method of the present invention. At step 1 a random first symmetric key is generated at the first radio communication device. User data of the first radio communication device is then encrypted with the generated first symmetric key at the first radio communication device, step 2. The user data may be encrypted. e.g. into one block of data or it may be encrypted on a file-by-file basis.

At step 3 the generated first symmetric key is encrypted at the first radio communication device with a public key of a third party. The public key may have been obtained beforehand and embedded in the first radio communication device in an integrity-protected manner so that an attacker cannot change or replace the public key. Alternatively the public key may be imported from outside for example while initiating the data transfer. If the public key is imported from outside, it may be accompanied by a certificate chain so that the first radio communication device can verify the legitimacy of the public key before accepting it. Alternatively, if the public key imported from outside is not accompanied by a certificate chain, the first radio communication device may show a fingerprint of the public key to user and ask for the user's acceptance of the public key before using the public key.

At step 4 a first authorization information is enclosed with the first symmetric key at the first radio communication device. The first authorization information may be e.g. a password input by the first party. The password may be input e.g. during the data transfer or it may have been input beforehand. Alternatively or additionally the first authorization information may be e.g. an identity information associated with the first party, such as an MSISDN-number (Mobile Subscriber International ISDN Number) of the first radio communication device. The MSISDN-number of the current SIM (Subscriber Identity Module) of the first radio communication device may e.g. be read beforehand and stored as authorization information to be used for future data transfers. In another embodiment of the present invention the authorization information may be left out. For example, if the keyboard of the first radio communication device is broken, the authorization information might be left out. A copy of the encrypted first symmetric key may then be stored with encrypted user data in the first radio communication device for the time being. If the transfer process would fail or be interrupted later on for some reason, the encrypted first symmetric key can then be easily retrieved.

The encrypted first symmetric key is sent from the first radio communication device to the second radio communication device via a transfer device, step 5. Next the received encrypted first symmetric key is decrypted at the second radio communication device by utilizing a secret key associated with the public key and comprised in a security device of the third party which security device is connected to the second radio communication device. In the embodiment of the present invention illustrated in FIG. 1 this is performed by first generating a random second symmetric key at the second radio communication device, step 6.

Next at step 7 a request message is generated at the second radio communication device, which request message comprises the generated second symmetric key and the received encrypted first symmetric key, and which request message is encrypted with the public key. A second authorization information is enclosed with the request message at the second radio communication device, step 8. The second authorization information should equal the first authorization information input earlier. In other words, if e.g. a password is asked, the first party or the user of the radio communication device should input the same password as earlier. However, if no first authorization information was enclosed, the second authorization information will also be left out. The request message is then sent from the second radio communication device to the security device, step 9.

At step 10 the received request message is decrypted at the security device with the secret key to obtain the second symmetric key and the encrypted first symmetric key. Next, at step 11 the obtained encrypted first symmetric key is further decrypted at the security device with the secret key to obtain the first symmetric key. At the security device it is verified that the received first authorization information matches the received second authorization information before generating the response message, step 12.

At step 13 a response message is generated at the security device, which response message comprises the obtained first symmetric key, and which response message is encrypted with the obtained second symmetric key. The response message is sent from the security device to the second radio communication device, step 14. If authorization information is used, as in the embodiment of the present invention illustrated in FIG. 1, the security device may then forget about this transaction. If no authorization information is used, the security device may record the encrypted first symmetric key and refuse to decrypt it again. In either case, the security device may store the response message for a while e.g. in a public repository so that it can be retrieved if the initial sending of the response message fails for some reason.

At step 15 the received response message is decrypted at the second radio communication device with the generated second symmetric key to obtain the decrypted first symmetric key. The decrypted first symmetric key may be stored in a file in the second radio communication device in case the transfer process will fail or be interrupted for some reason, e.g. due to power failure. The decrypted first symmetric key may be stored in the second radio communication device in a secure way if some of the user data being restored is subject to access control policies set by someone other than the first party, e.g. if the user data comprises copyrighted content or confidential business material that should not be forwarded.

The encrypted user data is then sent from the first radio communication device to the second radio communication device via the transfer device, step 16. Finally at step 17 the received encrypted user data is decrypted at the second radio communication device with the decrypted first symmetric key. After the data transfer has been successfully performed, the second radio communication device may delete the first and second symmetric keys. Correspondingly, if the transfer device has a copy of the encrypted user data, it may now be deleted. In another embodiment, further information may be enclosed with encrypted first symmetric key, the request message, and the response message. For example, an expiry date may be enclosed which the security device may utilize in determining how long to keep a record of the encrypted first symmetric key, if such a record is being kept.

Figure 2:
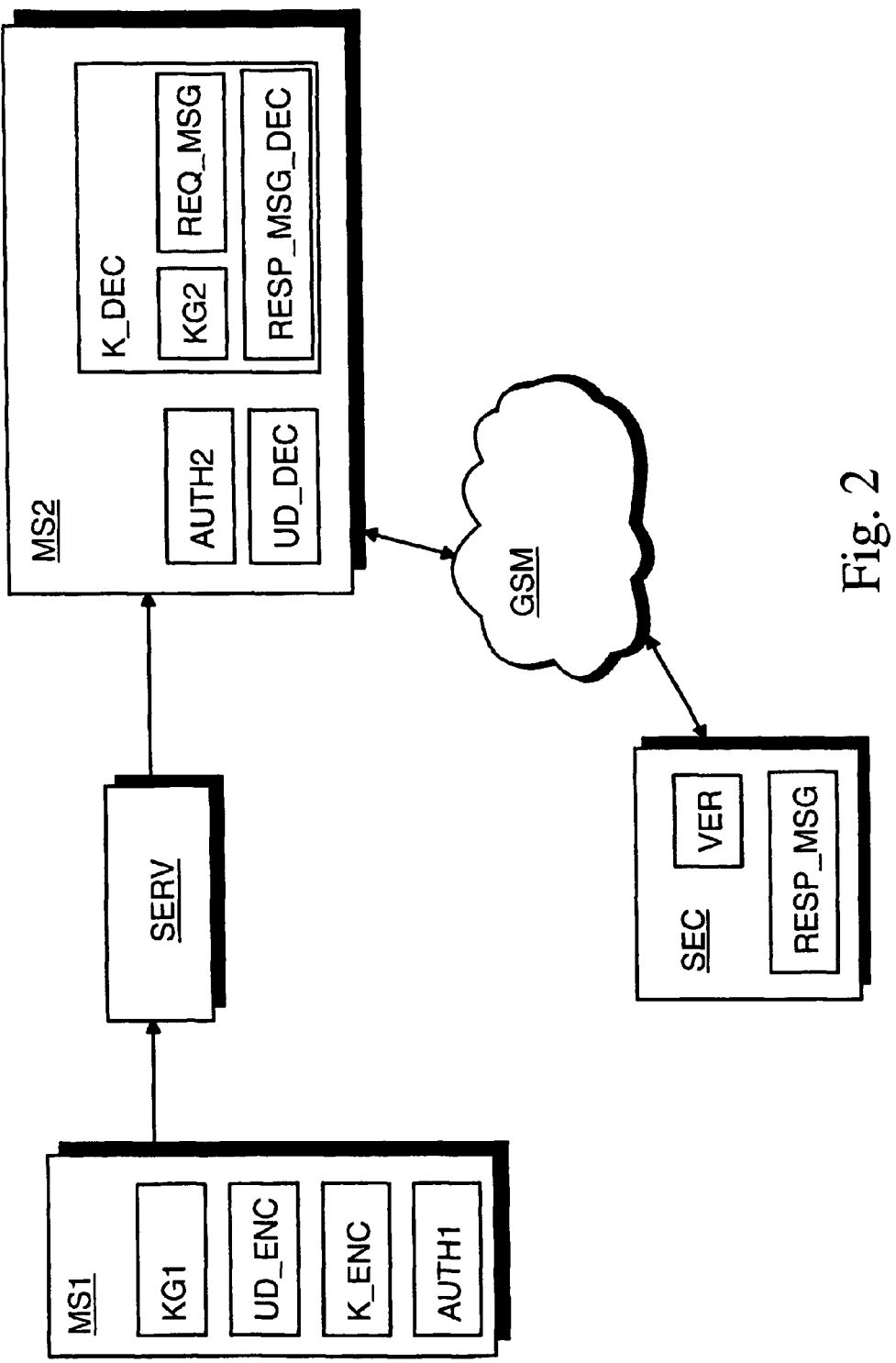
FIG. 2 is a block diagram illustrating a system according to an embodiment of the present invention.

FIG. 2 illustrates an exemplary embodiment of the system of the present invention. The exemplary embodiment illustrated in FIG. 2 relates to recovering user data from a first radio communication device of a first party which recovery is overseen by a second party such as servicing point personnel. The system comprises a first radio communication device MS1 of a first party having user data to be recovered, a second radio communication device MS2 for receiving the user data to be recovered, and, acting as a transfer device, a servicing device SERV of a second party for linking the first and second radio communication devices to each other and for overseeing the data recovery. The servicing device SERV may be e.g. a personal computer with suitable servicing software. In the exemplary embodiment of the system of the present invention illustrated in FIG. 2 the first and second radio communication devices are mobile telephones. The system further comprises a security device SEC of a third party connected to the second radio communication device MS2 and comprising a secret key associated with a public key. The security device SEC may be e.g. a server with suitable software. In the embodiment of the present invention illustrated in FIG. 2 the second radio communication device MS2 is connected to the security device SEC via a mobile telecommunication network GSM. In the embodiment of the present invention illustrated in FIG. 2 the mobile telecommunication network is a GSM (Global System for Mobile communication) network but, as is obvious to person skilled in the art, another digital mobile telecommunication network, such as a CDMA (Code-Division Multiple Access) network or WCDMA (Wideband Code-Division Multiple Access) network, may be used instead. Alternatively or in addition the second radio communication device MS2 may be connected to the security device SEC via a switched network such as Internet.

The first radio communication device MS1 comprises a first key generator KG1 for randomly generating a first symmetric key, and a user data encryption means UD_ENC for encrypting the user data with the generated first symmetric key. The first radio communication device MS1 further comprises a key encryption means K_ENC for encrypting the first symmetric key with said public key of the third party. The first radio communication device MS1 further comprises a first authorization means AUTH1 for enclosing a first authorization information with the first symmetric key.

The second radio communication device MS2 comprises key decryption means K_DEC for decrypting the encrypted first symmetric key by utilizing the secret key comprised in the security device SEC after the encrypted first symmetric key has been received from the first radio communication device MS1 via the servicing device SERV.

The key decryption means K_DEC comprises a second key generator KG2 for generating a random second symmetric key. The key decryption means K_DEC further comprises a request message means REQ_MSG for generating a request message comprising the generated second symmetric key and the received encrypted first symmetric key, for encrypting the request message with the public key, and for sending the request message to the security device SEC. The second radio communication device MS2 further comprises a second authorization means AUTH2 for enclosing a second authorization information with the request message.

The security device SEC comprises a response message means RESP_MSG for decrypting the received request message with the secret key to obtain the second symmetric key and the encrypted first symmetric key, for further decrypting the obtained encrypted first symmetric key with the secret key to obtain the first symmetric key, for generating a response message comprising the obtained first symmetric key, for encrypting the response message with the obtained second symmetric key, and for sending the response message to the second radio communication device. The security device SEC further comprises a verification means VER for verifying, before generating the response message, that the received first authorization information matches the received second authorization information.

The key decryption means K_DEC further comprises a response message decryption means RESP_MSG_DEC for decrypting the received response message with the generated second symmetric key to obtain the first symmetric key. The second radio communication device MS2 further comprises a user data decryption means UD_DEC for decrypting the encrypted user data with the decrypted first symmetric key after the encrypted user data has been received from the first radio communication device MS1 via the servicing device SERV.

It is obvious to a person skilled in the art that with the advancement of technology, the basic idea of the invention may be implemented in various ways. The invention and its embodiments are thus not limited to the examples described above, instead they may vary within the scope of the claims. In particular, even though an embodiment relating to data recovery in a servicing point is described, it is obvious to a person skilled in the art that the invention may be used in any situation in which delicate information needs to be transferred via a non-trusted second party.

The invention claimed is:

1. A method comprising:
generating randomly a first symmetric key at a first radio communication device of a first party;
encrypting user data of the first radio communication device with the generated first symmetric key at the first radio communication device;
encrypting, at the first radio communication device, the generated first symmetric key with a public key of a third party;
sending the encrypted first symmetric key from the first radio communication device to a second radio communication device via a transfer device of a second party;
decrypting, at the second radio communication device, the received encrypted first symmetric key using a secret key associated with the public key and comprised in a security device of the third party, the security device connected to the second radio communication device,
sending the encrypted user data from the first radio communication device to the second radio communication device via the transfer device, and
decrypting, at the second radio communication device, the received encrypted user data with the decrypted first symmetric key,
wherein the method is configured to provide secure data transfer from the first radio communication device of the first party to the second radio communication device, and the data transfer is configured to be overseen by the transfer device of the second party;
wherein the decrypting, at the second radio communication device, the received encrypted first symmetric key using the secret key associated with the public key and comprised in the security device of the third party further comprises:
generating randomly, at the second radio communication device, a second symmetric key,
generating, at the second radio communication device, a request message comprising the generated second symmetric key and the received encrypted first symmetric key, and the request message encrypted with the public key,
sending the request message from the second radio communication device to the security device,
decrypting, at the security device, the received request message with the secret key to obtain the second symmetric key and the encrypted first symmetric key,
further decrypting, at the security device, the obtained encrypted first symmetric key with the secret key to obtain the decrypted first symmetric key,
generating, at the security device, a response message comprising the obtained first symmetric key, and the response message encrypted with the obtained second symmetric key, sending the response message from the security device to the second radio communication device, and
decrypting, at the second radio communication device, the received response message with the generated second symmetric key to obtain the decrypted first symmetric key.

2. The method according to claim 1 comprising:
enclosing, at the first radio communication device, a first authorization information with the first symmetric key;
enclosing, at the second radio communication device, a second authorization information with the request message; and
verifying, at the security device, that the received first authorization information matches the received second authorization information before performing the generating the response message.

3. The method according to claim 2, further comprising:
using a password input by the first party as the first authorization information and as the second authorization information.

4. The method according to claim 2, further comprising:
using identity information associated with the first party as the first authorization information and as the second authorization information.

5. A system, comprising:
a first radio communication device of a first party configured to have user data to be transferred, wherein the first radio communication device comprises a first key generator configured to randomly generate a first symmetric key, and a user data encryption unit configured to generate the user data with the generated first symmetric key;
a second radio communication device configured to receive the user data to be transferred;
a transfer device of a second party configured to link the first and second radio communication devices to each other and configured to oversee the data transfer; and
a security device of a third party connected to the second radio communication device,
wherein the security device comprises a secret key associated with a public key of the third party,
wherein the first radio communication device further comprises a key encryption unit configured to encrypt the first symmetric key with the public key of the third party,
wherein the second radio communication device further comprises
a key decryption unit configured to decrypt the encrypted first symmetric key using the secret key comprised in the security device when the encrypted first symmetric key has been received from the first radio communication device via the transfer device, and
a user data decryption unit configured to decrypt the encrypted user data with the decrypted first symmetric key when the encrypted user data has been received from the first radio communication device via the transfer device, and
wherein the system is configured to provide secure data transfer between radio communication devices;
wherein the key decryption unit further comprises
a second key generator configured to randomly generate a second symmetric key, and
a request message unit configured to generate a request message comprising the generated second symmetric key and the received encrypted first symmetric key, wherein the request message unit is configured to encrypt the request message with the public key, and to send the request message to the security device, and
wherein in that the security device comprises
a response message unit configured to decrypt the received request message with the secret key to obtain the second symmetric key and the encrypted first symmetric key, configured to further decrypt the obtained encrypted first symmetric key with the secret key to obtain the first symmetric key, configured to generate a response message comprising the obtained first symmetric key, configured to encrypt the response message with the obtained second symmetric key, and configured to send the response message to the second radio communication device, and
wherein the key decryption unit further comprises
a response message decryption unit configured to decrypt the received response message with the generated second symmetric key to obtain the first symmetric key.

6. The system according to claim 5, wherein the first radio communication device further comprises
a first authorization unit configured to enclose a first authorization information with the first symmetric key,
wherein the second radio communication device further comprises:
a second authorization unit configured to enclose a second authorization information with the request message, and
wherein the security device further comprises:
a verification unit configured to verify, before the response message is generated, that the received first authorization information matches the received second authorization information.

7. The system according to claim 5, wherein the second radio communication device is connected to the security device via a mobile telecommunication network.

* * * * *